US009701363B2

(12) United States Patent
Yamada

(10) Patent No.: US 9,701,363 B2
(45) Date of Patent: Jul. 11, 2017

(54) SENSOR ASSEMBLY AND DRIVE UNIT FOR BICYCLE AND BICYCLE

(71) Applicant: YAMAHA HATSUDOKI KABUSHIKI KAISHA, Iwata-shi, Shizuoka (JP)

(72) Inventor: Masaichi Yamada, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/074,026

(22) Filed: Mar. 18, 2016

(65) Prior Publication Data

US 2016/0272278 A1    Sep. 22, 2016

(30) Foreign Application Priority Data

Mar. 20, 2015   (JP) ................... 2015-057997

(51) Int. Cl.
  *B62J 99/00* (2009.01)
  *B62M 6/90* (2010.01)
  *B62M 6/50* (2010.01)
  *B62M 6/80* (2010.01)
  *G01P 3/487* (2006.01)
  *H02P 7/18* (2006.01)

(52) U.S. Cl.
  CPC ............... *B62M 6/90* (2013.01); *B62J 99/00* (2013.01); *B62M 6/50* (2013.01); *B62M 6/80* (2013.01); *G01P 3/487* (2013.01); *H02P 7/18* (2013.01); *B62J 2099/002* (2013.01)

(58) Field of Classification Search
  CPC ... B62M 6/90; B62M 6/50; B62M 6/80; B62J 99/00; B62J 2099/002; G01P 3/487; H02P 7/18

USPC ...... 318/139, 400.38, 400.37; 280/735, 12.1, 280/827, 828, 277, 288.4; 180/218, 220, 180/219, 226, 206.3; 301/2.5, 124.1
See application file for complete search history.

(56) References Cited

U.S. PATENT DOCUMENTS

| 6,163,148 | A | * | 12/2000 | Takada | ...................... B62M 6/45 180/206.3 |
| 6,580,188 | B2 | * | 6/2003 | Katagiri | ............... B60L 11/1801 180/65.26 |
| 7,097,407 | B2 | * | 8/2006 | Kurohori | ............. B62K 15/008 296/37.6 |
| 8,205,705 | B2 | * | 6/2012 | Li | ....................... B60L 11/1801 180/206.4 |
| 8,490,732 | B2 | * | 7/2013 | Sugimoto | ................ B60K 1/04 180/206.1 |
| 8,830,045 | B2 | * | 9/2014 | Goldwater | ................. B62J 6/20 340/427 |

(Continued)

FOREIGN PATENT DOCUMENTS

JP    56-130163 U    10/1981
JP    2010-179877 A   8/2010

(Continued)

*Primary Examiner* — Rita Leykin
(74) *Attorney, Agent, or Firm* — Keating and Bennett, LLP

(57) ABSTRACT

A sensor assembly includes a detected portion that rotates a front wheel, a detector that detects the rotation of the detected portion, and a holder that is fixed to one of a body frame and the front wheel so as not to rotate, wherein the holder supports the detector and the detected portion so as to rotate relative to each other.

10 Claims, 4 Drawing Sheets

(56) References Cited

U.S. PATENT DOCUMENTS

| | | | |
|---|---|---|---|
| 8,899,110 B2* | 12/2014 | Matsumoto | B62J 99/00 73/379.07 |
| 9,090,178 B2* | 7/2015 | Tsuchizawa | B60L 15/20 |
| 9,102,381 B2* | 8/2015 | Zanfei | B62M 6/50 |
| 9,108,495 B2* | 8/2015 | Zanfei | B60K 7/0007 |
| 9,120,533 B2* | 9/2015 | Zanfei | B62M 6/50 |
| 9,272,751 B2* | 3/2016 | Searles | B62M 6/50 |
| 9,302,734 B2* | 4/2016 | Getta | B62M 6/55 |
| 9,334,013 B2* | 5/2016 | Gros | B62J 99/00 |
| 9,346,516 B2* | 5/2016 | Song | B62M 6/50 |
| 9,376,164 B2* | 6/2016 | Tanaka | B62M 6/50 |
| 9,377,326 B2* | 6/2016 | Huang | B62M 6/50 |
| 9,409,622 B2* | 8/2016 | Gros | B62J 99/00 |
| 9,434,446 B2* | 9/2016 | Kawakami | B62M 6/50 |
| 2012/0097467 A1* | 4/2012 | Maeno | B62M 6/55 180/206.7 |
| 2014/0123483 A1* | 5/2014 | Wilsey | B62M 6/90 29/825 |
| 2015/0008059 A1* | 1/2015 | Douglas | B62K 25/32 180/206.1 |
| 2015/0191215 A1* | 7/2015 | Kawakami | B62M 6/55 477/4 |
| 2016/0167733 A1* | 6/2016 | Kawakami | B62M 6/50 180/220 |
| 2016/0185412 A1* | 6/2016 | Zuo | B62K 3/007 180/218 |
| 2016/0298983 A1* | 10/2016 | Savchenko | G01C 19/56 |

FOREIGN PATENT DOCUMENTS

| | | | | |
|---|---|---|---|---|
| JP | WO2014061058 | * | 4/2014 | B62J 99/00 |
| JP | 2015-47888 A | | 3/2015 | |
| WO | 2014/061058 A1 | | 4/2014 | |

* cited by examiner

SENSOR ASSEMBLY AND DRIVE UNIT FOR BICYCLE AND BICYCLE

BACKGROUND OF THE INVENTION

1. Field of the Invention

The present invention relates to a sensor assembly and a drive unit for a bicycle, and to a bicycle.

2. Description of the Related Art

A sensor assembly which can detect a wheel speed of a wheel is known from JP-UM-56-130163 and the like. This sensor assembly includes a magnet that is attached to a wheel to rotate together with the wheel and a sensor that is fixed to a body frame so that the sensor detects a rotation of the magnet.

In the above sensor assembly, a sensor and a magnet are spaced apart from each other in the direction of a wheel axis. In the event that a wheel is supported so as to rotate smoothly by a body frame such as a front fork, a certain gap distance is provided between the body frame and a wheel in relation to the direction of the wheel axis of the wheel. This gap allows the wheel to rotate smoothly relative to the body frame. In consideration of the accuracy with which the wheel is assembled to the body frame, the axial gap cannot be reduced needlessly. This results in a situation in which the sensor fixed to the body frame is spaced apart from the magnet attached to the wheel in the axial direction. In addition, when the distance between the magnet and the sensor is increased, the magnetic force reaching the sensor is attenuated, and therefore, a large magnet must be used.

SUMMARY OF THE INVENTION

Preferred embodiments of the present invention provide a compact sensor assembly, a drive unit including the sensor assembly, and a bicycle including the drive unit.

According to a preferred embodiment of the present invention, a sensor assembly that is attachable to a bicycle including a wheel that is supported rotatably on a body frame, includes a detected portion that rotates together with the wheel, a detector that detects a rotation of the detected portion, and a holder to be fixed to one of the body frame and the wheel so as not to rotate, wherein the holder supports the detector and the detected portion so that the detector and the detected portion rotate relative to each other.

According to a preferred embodiment of the present invention, both the detected portion and the detector are supported on the holder, and therefore, a distance of a gap between the detected portion and the detector is easily controlled. This allows the gap between the detected portion and the detector to be small while allowing the detected portion to rotate smoothly relative to the detector. As a result, the entire sensor assembly is compact.

In a sensor assembly according to a preferred embodiment of the present invention, the holder is preferably configured to be fixed to the body frame so as not to rotate, and the holder preferably supports the detector so as not to rotate and supports the detected portion so as to rotate.

In a sensor assembly according to a preferred embodiment of the present invention, a rotation transmission on a hub of the wheel preferably transmits a rotational force of the wheel to the detected portion.

In a sensor assembly according to a preferred embodiment of the present invention, the rotational force of the wheel is preferably transmitted by bringing a circumferential end surface of an engaging member that is provided on the rotation transmission into abutment with a circumferential end surface of an engaged member that is provided on the detected portion.

In a sensor assembly according to a preferred embodiment of the present invention, an outer circumferential edge of the detector and an outer circumferential edge of the detected portion are preferably situated closer to a wheel axis of the wheel than an outer circumferential edge of the hub in a radial direction which intersects the wheel axis at a right angle.

In a sensor assembly according to a preferred embodiment of the present invention, the detected portion faces the detector with a gap therebetween in the direction of the wheel axis of the wheel, and at least a portion of an outer circumferential edge of the gap is preferably covered by a cover that is attached to the body frame.

In a sensor assembly according to a preferred embodiment of the present invention, the detected portion faces the detector with a gap therebetween in the direction of the wheel axis of the wheel, and a circumferential projection is preferably provided on one of the detected portion and the detector so as to project towards the other of the detected portion and the detector so as to define the gap.

In a sensor assembly according to a preferred embodiment of the present invention, the circumferential projection is preferably provided on an inner circumferential portion of one of the detected portion and the detector in a radial direction that intersects the wheel axis of the wheel.

According to another preferred embodiment of the present invention, a drive unit includes an electric motor, a battery that supplies electric power to the electric motor, a power transmission that transmits a motor torque of the electric motor to the wheel, the sensor assembly defined above, and a controller configured or programmed to control an energy supplied to the electric motor based on an output of the detector.

According to a further preferred embodiment of the present invention, a bicycle includes the sensor assembly defined above, and a display that displays the results of an output of the detector.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
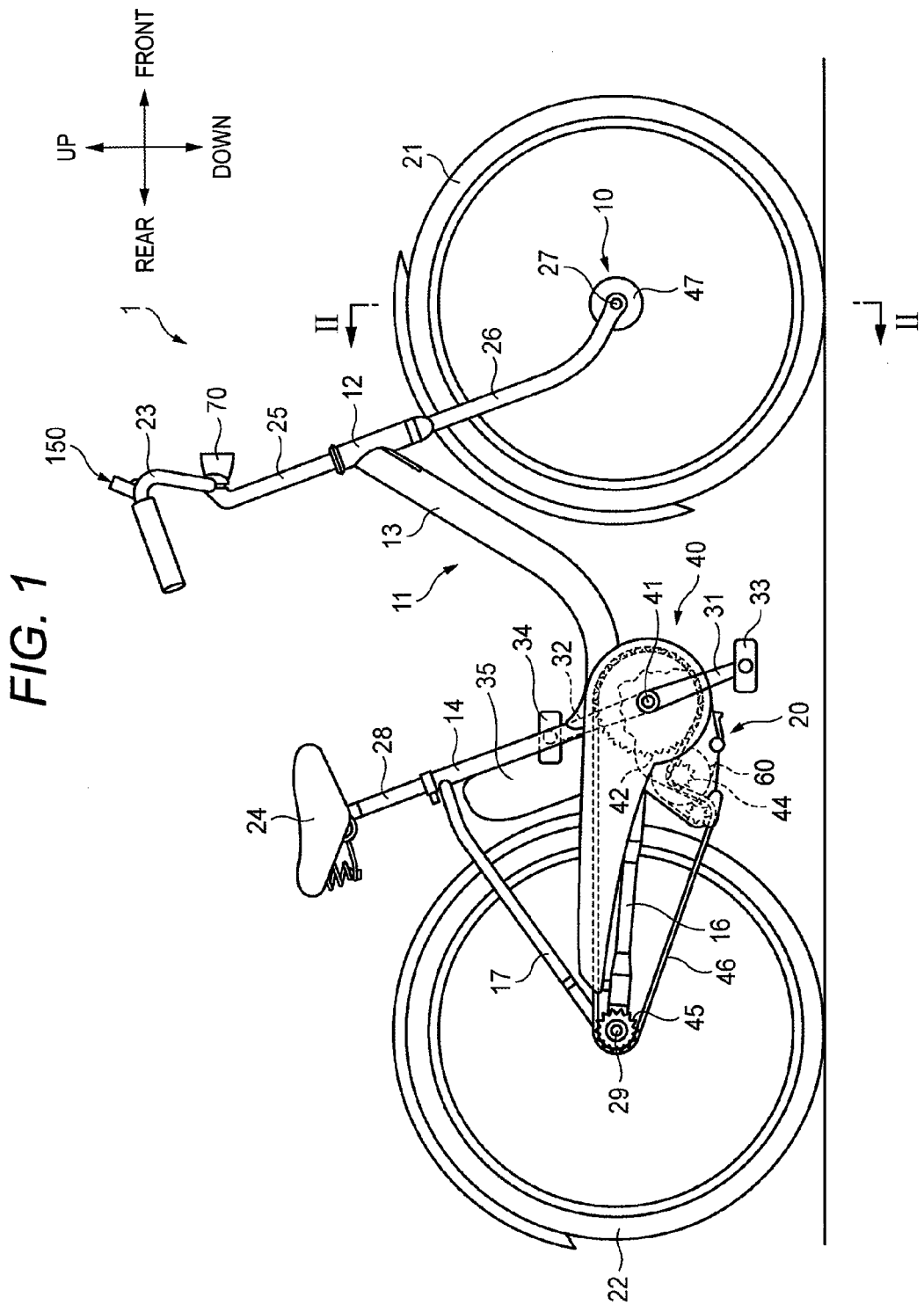
FIG. 1 is a right side view of an electric bicycle according to a preferred embodiment of the present invention.

Hereinafter, referring to the drawings, preferred embodiments of the present invention will be described. Dimensions of constituent elements in the drawings do not always represent actual dimensions of the constituent elements and dimensional ratios of the constituent elements.

In the following description, front, rear, left, and right refer to front, rear, left, and right as viewed from a rider who is seated on a seat 24 of an electric bicycle 1 while gripping the handgrips of a handlebar 23.

FIG. 1 shows a schematic configuration of an electric bicycle 1 according to a preferred embodiment of the present invention.

The electric bicycle 1 is arranged such that a pedal effort exerted on pedals 33, 34 by a rider is assisted by an assisting force that is outputted from an electric motor 60.

As shown in FIG. 1, the electric bicycle 1 includes a body frame 11 that extends in a front-to-rear direction. The electric bicycle 1 includes a front wheel 21, a rear wheel 22, a handlebar 23, a seat 24, and a drive unit 40.

The body frame 11 includes a head tube 12, a down tube 13, a seat tube 14, a pair of chain stays 16, and a pair of seat stays 17. The head tube 12 is disposed at a front portion of the electric bicycle 1. A front portion of the down tube 13 that extends to the rear is connected to the head tube 12. The seat tube 14 is connected to a rear portion of the down tube 13. The seat tube 14 extends obliquely upwards and rearwards from a rear end portion of the down tube 13.

A handlebar stem 25 is inserted into the head tube 12 so as to turn freely. The handlebar 23 is fixed to an upper end portion of the handlebar stem 25. A front fork 26 is fixed to a lower end portion of the handlebar stem 25. The front wheel 21 is supported rotatably at a lower end portion of the front fork 26 by a wheel axle 27.

A seat post 28 is inserted into the cylindrical seat tube 14. The seat 24 is provided at an upper end portion of the seat post 28.

The pair of chain stays 16 are provided so as to hold the rear wheel 22 from the left and right thereof. The pair of chain stays 16 extends from a rear portion of the down tube 13 towards a rotational center of the rear wheel 22. The pair of seat stays 17 extends from an upper portion of the seat tube 14 towards the rotational center of the rear wheel 22. The rear wheel 22 is supported rotatably at rear end portions of the chain stays 16 and the seat stays 17 by a wheel axle 29.

A battery 35 is disposed at a rear side of the seat tube 14, and the battery 35 supplies electric power to an electric motor 60 of the drive unit 40, which will be described below. The battery 35 preferably includes a chargeable-dischargeable rechargeable battery and a battery controller, which are not shown. The battery controller controls the charging and discharging of the rechargeable battery and monitors an output current and a residual capacity or the state of the charge.

A crankshaft 41, a drive sprocket 42, a driven sprocket 45, and a chain 46 define a power transmission 20 which transmits motor torque from the electric motor and a pedal effort inputted into the pedals 33, 34 to the rear wheel 22. The drive unit 40 includes the power transmission 20, the electric motor 60, the battery 35, a sensor assembly 80 that includes a detector, which will be described below, and a controller configured or programmed to control energy that is supplied to the electric motor based on an output of the detector.

The crankshaft 41 rotates at a lower portion of the seat tube 14. The crankshaft 41 extends in a left-and-right direction. Crank arms 31, 32 are attached to both end portions of the crankshaft 41. The pedals 33, 34 are attached individually to distal ends of the crank arms 31, 32 in a rotatable manner.

The drive sprocket 42 is attached to a right portion of the crankshaft 41. The drive sprocket 42 rotates together with the crankshaft 41. The driven sprocket 45 is concentric with the wheel axle 29 of the rear wheel 22. The driven sprocket 45 is connected to the rear wheel 22 via a one-way clutch, not shown.

The endless chain 46 extends between the drive sprocket 42 and the driven sprocket 45. This allows the drive sprocket 42 to rotate when the rider rotates the pedals 33, 34 with his or her feet. Further, the rotation of the drive sprocket 42 is transmitted to the drive sprocket 45 by way of the chain 46 to drive the rear wheel 22.

The electric motor 60 is fixed to the body frame 11 near the crankshaft 41. An auxiliary sprocket 44 is provided on an output shaft of the electric motor 60. Electric power is supplied to the electric motor 60 from the battery 35. Supplying electric power to the electric motor 60 starts the electric motor 60 rotating. The rotation of the electric motor 60 is transmitted to the chain 46 by way of the auxiliary sprocket 44. In this way, when electric power is supplied to the electric motor 60, a driving assist force is produced in the electric motor 60. This assist force is transmitted to the rear wheel 22 by way of the chain 61.

A display 150 is provided at an upper portion of the handlebar 23. The display 150 displays the results of an output that is transmitted from the detector of the sensor assembly 80.

Figure 2:
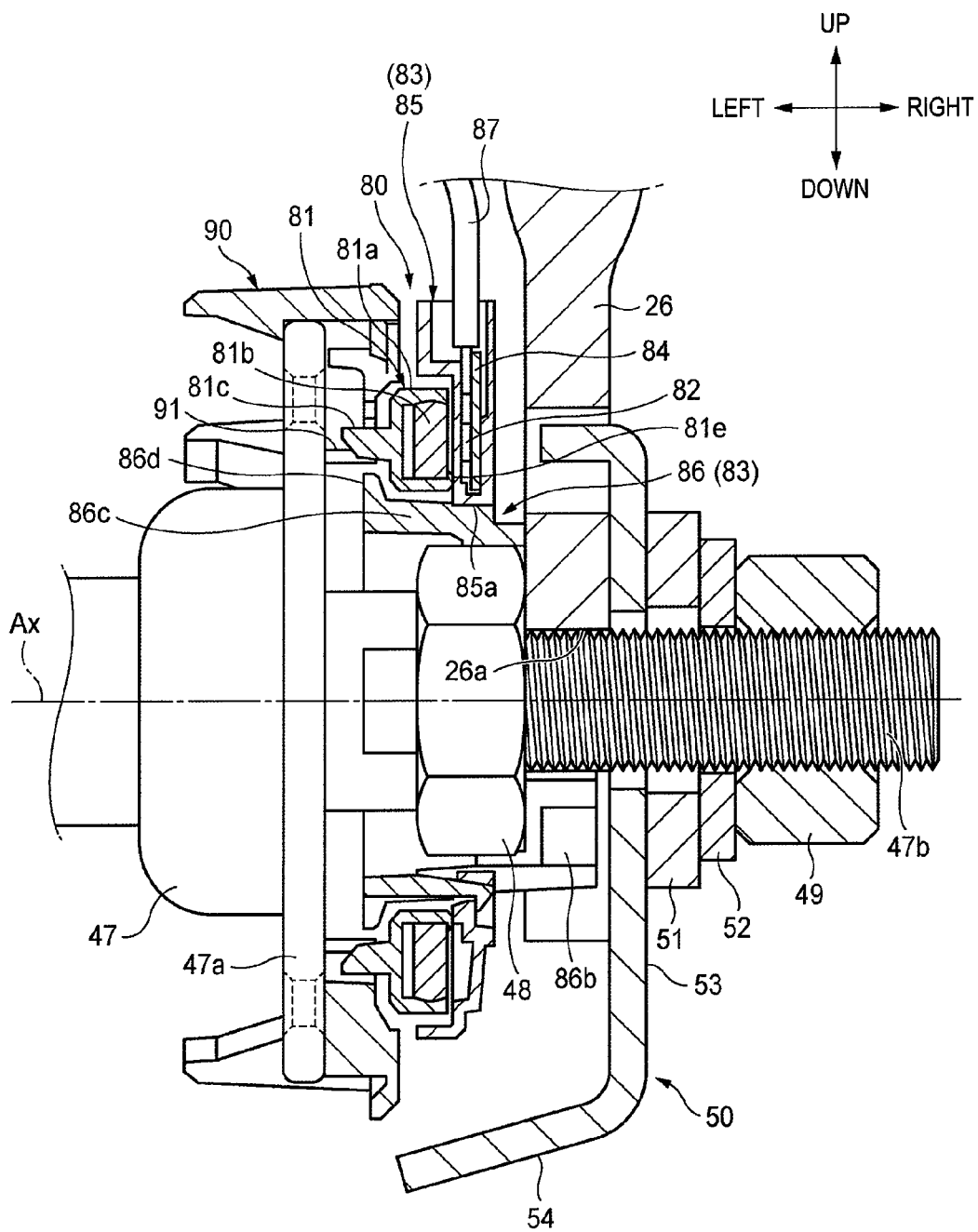
FIG. 2 is a sectional view taken along a line II-II in FIG. 1.
Figure 3:
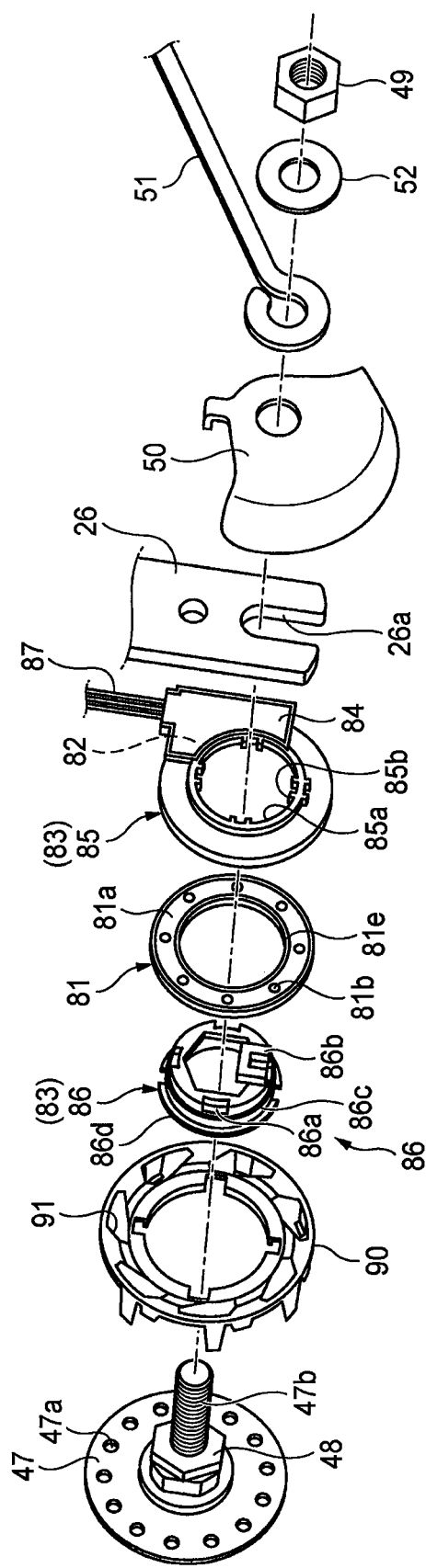
FIG. 3 is an exploded perspective view of a sensor assembly shown in FIG. 2.

FIG. 2 is a sectional view taken along a line II-II in FIG. 1. FIG. 3 is an exploded perspective view of the sensor assembly 80 shown in FIG. 2. As shown in FIGS. 2 and 3, the front wheel 21 includes a hub 47. The hub 47 is supported at a lower portion of the front fork 26 so as to rotate about a wheel axis Ax. The wheel axis Ax extends in a left-and-right direction. The hub 47 includes a hub flange 47a that extends in a radial direction that is at a right angle to the wheel axis Ax. Spokes, not shown, are supported on the hub flange 47a.

The hub 47 includes a shaft 47b which extends in the direction of the wheel axis Ax. The shaft 47b penetrates a cutout 26a provided at the lower portion of the front fork 26. Threaded grooves are provided on an outer circumferential surface of the shaft 47b. The cutout 26a is open at the lower end of the front fork 26.

A first nut 48 is screwed onto the shaft 47b. The first nut 48 is provided between the front fork 26 and the hub flange 47a. A sensor cover 50, a stay 51, and a washer 52 sequentially pass over the shaft 47b that projects to the right from the front fork 26, in that order, from the left to the right. A second nut 49 is screwed onto a rightmost portion of the shaft 47b. The sensor cover 50, the stay 51, and the washer 52 are tightened together in the direction of the wheel axis Ax towards the front fork 26 by the first nut 48 and the second nut 49.

The electric bicycle 1 includes a sensor assembly 80. The sensor assembly 80 includes a detected portion 81 that rotates together with the front wheel 21, a sensor (an example of the detector) 82 that detects the rotation of the detected portion 81, and a holder 83. The holder 83 includes a sensor case 85 that accommodates the sensor 82 and a dislocation preventing member 86. The holder 83 supports the sensor 82 so as not to rotate and rotatably supports the detected portion 81.

Figure 4:
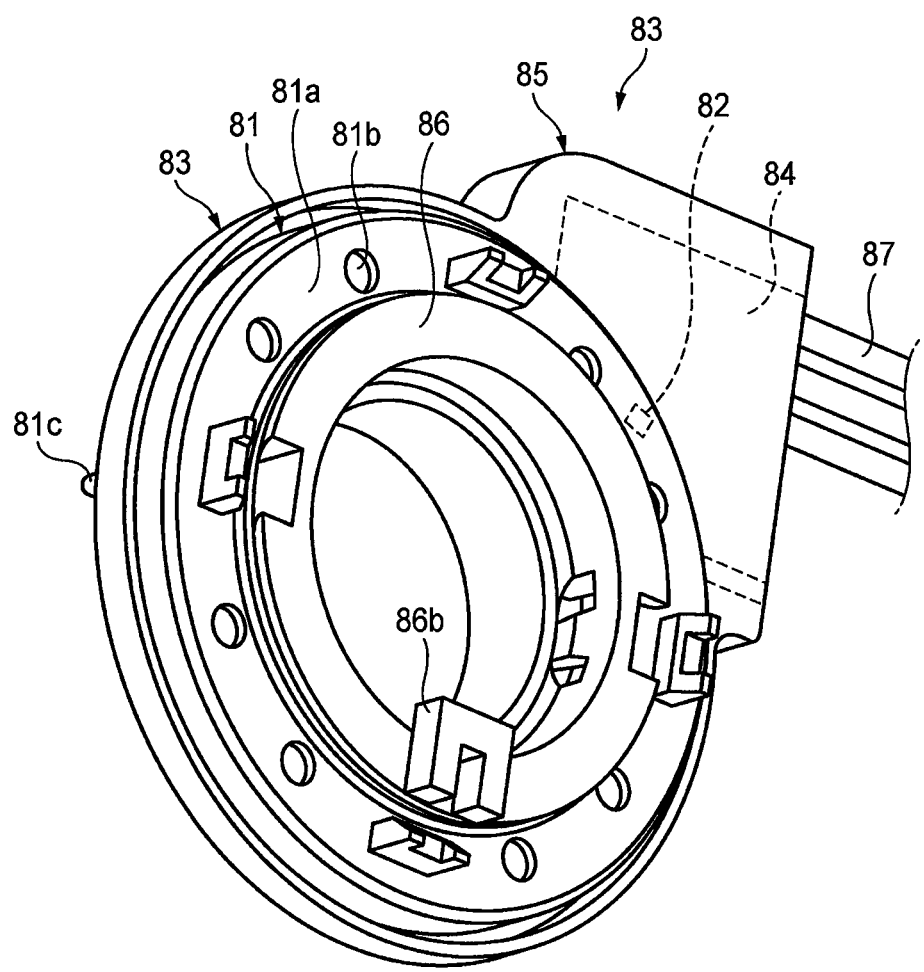
FIG. 4 is a perspective view of a detected portion of the sensor assembly.

FIG. 4 is a perspective view of the detected portion 81. As shown in FIG. 4, in this preferred embodiment, the detected portion 81 is a magnet, and the sensor 82 is a magnetic sensor. FIG. 4 is a perspective view of the detected portion 81. As shown in FIG. 4, the detected portion 81 includes a ring-shaped magnet support 81a and a plurality of magnets 81b which are provided on the magnet support 81a so as to be spaced apart from one another in a circumferential direction.

As shown in FIG. 2, the sensor 82 is mounted on a support circuit board 84. The sensor 82 faces the detected portion 81 in the direction of the wheel axis Ax. The support circuit board 84 is fixed to the sensor case 85.

The sensor case 85 is preferably a flat ring-shaped member. A cavity is provided in an interior of the sensor case 85. The sensor 82 and the support circuit board 84 are fixed in place in an interior of the cavity. A signal wire 87 extends from the support circuit board 84 to an exterior portion of the sensor case 85. The signal wire 87 extends upwards along the front fork 26 to be connected to the display 150 and a controller of the drive unit.

In this way, the sensor 82 is fixed to the holder 83 so as not to rotate.

As shown in FIG. 3, the dislocation preventing member 86 is inserted into a hole 85a that is provided in a radial center of the sensor case 85. The dislocation preventing member 86 is brought into engagement with the sensor 85 so that the detected portion 81 is supported rotatably between the dislocation preventing member 86 and the sensor case 85.

The dislocation preventing member 86 includes recesses 86a at four locations spaced apart from one another in the circumferential direction. The recesses 86a accommodate projections 85b provided on the sensor case 85 that extend towards the radial center thereof. By using this configuration, the dislocation preventing member 86 is fitted in the sensor case 85 in such a way that the dislocation preventing member 86 cannot move in the circumferential direction relative to the sensor case 85.

The dislocation preventing member 86 includes a rotation preventing member 86b that projects in the direction of the wheel axis Ax. The rotation preventing member 86b preferably has a similar size to that of the cutout 26a in the front fork 26. With the rotation preventing member 86b having entered the cutout 26a, the rotation preventing member 86b comes into abutment with the front fork 26 so that the rotation preventing member 86b is prevented from rotating about the wheel axis Ax.

As shown in FIG. 2, the dislocation preventing member 86 includes a main body 86c having an outside diameter that is slightly smaller than a bore diameter of the magnet support 81a and a flange 86d having an outside diameter that is greater than the bore diameter of the magnet support 81a. With the dislocation preventing member 86 and the sensor case 85 connected together, the detected portion 81 is provided between the flange 86d of the dislocation preventing member 86 and a left end surface of the sensor case 85. The detected portion 81 is brought into abutment with an outer circumferential surface of the dislocation preventing member 86 and is able to rotate around the dislocation preventing member 86. The flange 86d of the dislocation preventing member 86 prevents the magnet support 81a from being dislocated in the direction of the wheel axis Ax.

In this way, the detected portion 81 is supported rotatably on the holder 83.

An engaged member 81c is provided on the magnet support 81a so as to project to the left in the direction of the wheel axis Ax. The sensor assembly 80 includes a rotation transmission 90 that transmits rotational force of the front wheel 21 to the detected portion 81. The rotation transmission 90 is attached to the hub 47 so as not to rotate. The rotation transmission 90 includes a recess (an example of an engaging member) 91 that opens to the right in the direction of the wheel axis Ax. The recess 91 is sized so as to accommodate the engaged member 81c therein.

The rotational force of the front wheel 21 is transmitted to the detected portion 81 by bringing a circumferential end surface of the recess 91 provided on the rotation transmission 90 into abutment with a circumferential end surface of the engaged member 81c provided on the detected portion 81. This allows the rotation transmission 90 to transmit the rotational force of the front wheel 21 to the detected portion 81 without transmitting a force in the direction of the wheel axis Ax to the detected portion 81.

The dislocation preventing member 86 that defines a portion of the holder 83 is fixed to the lower portion of the front fork 26 so as not to rotate via the rotation preventing member 86b. The sensor case 85 that defines another portion of the holder 83 is fixed to the dislocation preventing member 86 so as not to rotate due to the recesses 86a of the dislocation preventing member 86 fitting on the projections 85b of the sensor case 85. This fixes the holder, which includes the dislocation preventing member 86 and the sensor case 85, to the lower portion of the front fork 26 so as not to rotate. The sensor 82 that is fixed to the sensor case 85 is also fixed to the front fork 26 so as not to rotate.

When the front wheel 21 rotates, the rotation transmission 90 that is attached to the front wheel 21 rotates together with the front wheel 21. The rotation transmission 90 transmits the rotation of the front wheel 21 to the magnet support 81a by way of the recess 91 and the engaged member 81c. This allows the detected portion 81 to rotate together with the front wheel 21 while being kept supported on the holder 83. Because of this arrangement, when the front wheel 21 rotates, the detected portion 81 rotates relative to the sensor 82. The sensor 82 detects the rotation of the detected portion 81 and transmits a signal that signals the rotation of the detected portion 81 to the display 150 and to the control module of the drive unit by way of the signal wire 87.

In this way, the sensor assembly 80 according to the present preferred embodiment supports the detected portion 81 and the sensor 82 so as to rotate relative to each other. The distance of a gap between the detected portion 81 and the sensor 82 in the direction of the wheel axis Ax is easily controlled because both the detected portion 81 and the sensor 82 are supported on the holder 83. This allows the gap between the detected portion 81 and the sensor 82 to be small while allowing the detected portion 81 to rotate smoothly relative to the sensor 82. As a result, the entire sensor assembly 80 is compact.

In the present preferred embodiment, the holder 83 preferably is fixed to the front fork 26 so as not to rotate, and the holder 83 supports the sensor 82 so as not to rotate but supports the detected portion 81 so as to rotate. Wiring is easy because the signal wire extending from the sensor 82 extends along the holder 83 that does not rotate relative to the sensor 82 and the front fork 26.

As shown in FIG. 2, an outer edge of the sensor 82 and an outer edge of the detected portion 81 are situated closer to the wheel axle than an outer edge of the hub 47 in the radial direction that is at a right angle to the wheel axis Ax of the front wheel 21. This enables the entire sensor assembly 80 to be compact also in the radial direction.

The detected portion 81 faces the sensor 82 with the gap therebetween in the direction of the wheel axis Ax of the front wheel 21. The sensor cover 50 that is attached to the front fork 26 includes a portion 53 which extends in the radial direction that is at a right angle to the wheel axis Ax and a gap cover 54 that is provided at a lower portion of the portion 53. The gap cover 54 extends leftwards and downwards from the portion 53. The gap cover 54 of the sensor cover 50 covers at least a portion of an outer circumferential edge of the gap that is provided between the detected portion 81 and the sensor 82. This sensor cover 50 prevents gravel and stones that are kicked up from a road surface from entering the gap between the detected portion 81 and the sensor 82.

The detected portion 81 faces the sensor 82 with the gap therebetween in the direction of the wheel axis Ax of the front wheel 21. The magnet support 81a includes a circumferential projection 81e which projects towards the sensor 82 so as to define the gap. This allows the magnet 81b to rotate in an interior of the holder 83 in a stable posture while keeping a constant distance from the sensor 82.

As shown in FIG. 2, the circumferential edge 81e is preferably provided in an inner circumferential portion in relation to a circumferential direction that is at a right angle to the wheel axis Ax of the front wheel 21. Providing the circumferential projection 81e in the inner circumferential portion rather than in an outer circumferential portion slows the rotation speed of the circumferential projection 81e relative to the sensor case 85 when the detected portion 81 rotates relative to the sensor case 85. This significantly reduces or prevents the wear of the circumferential projection 81e. When the inner circumferential portion and the outer circumferential portion are referred to herein, a portion that is farther radially inward than the radial center of the sensor case 85 is referred to as the inner circumferential portion, and a portion that is farther radially outward than the radial center is referred to the outer circumferential portion.

Although the circumferential projection 81e is described as being provided on the magnet support 81a, a circumferential projection may be provided on the sensor case 85 so as to project towards the magnet support 81a.

In the preferred embodiments that have been described heretofore, although the holder 83 is described as being fixed to the front fork 26 that defines a portion of the body frame, the present invention is not limited thereto. The holder could be fixed to one of the body frame and the wheel so as not to rotate. For example, the holder may be fixed to the front wheel so as not to rotate, the detected portion may be supported on the holder so as to not to rotate, the sensor may be supported on the holder so as to rotate, and the sensor may be supported so as not to rotate relative to the front fork by the rotation preventing member that is attached to the front fork. As this occurs, the detected portion rotates together with the front wheel, and the detected portion rotates relative to the sensor that is fixed to the front fork so as not to rotate.

In the above-described preferred embodiments of the present invention, although the detected portion 81 is described as preferably facing the sensor 82 in the direction of the wheel axis Ax, the present invention is not limited thereto. For example, the detected portion and the sensor may face each other in the radial direction. As this occurs, the detected portion and the sensor are disposed in positions that are superposed one on the other in the direction of the wheel axis Ax, the detected portion is disposed on an outer circumferential side (or an inner circumferential side) of the sensor, and the detected portion is disposed so as to face the sensor in the radial direction.

In the above description, preferred embodiments of the present invention are described as preferably being applied to the electric bicycle 1. However, preferred embodiments of the present invention may be applied to a bicycle that does not include an electric motor.

Additionally, in the above-described preferred embodiments of the present invention, the sensor assembly 80 is described as detecting the rotation of the front wheel 21. However, the sensor assembly 80 may detect the rotation of the rear wheel 22.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A sensor assembly that is attachable to a bicycle including a wheel that is supported rotatably on a body frame, the sensor assembly comprising:
   a detected portion that rotates together with the wheel;
   a detector that detects a rotation of the detected portion; and
   a holder that is attachable to one of the body frame and the wheel to prevent rotation of the holder; wherein
   the holder supports the detector and the detected portion so that the detector and the detected portion rotate relative to each other.

2. The sensor assembly according to claim 1, wherein the holder is fixed so as not to rotate, and the holder supports the detector to prevent rotation of the detector, and supports the detected portion to allow rotation of the detected portion.

3. The sensor assembly according to claim 1, further comprising a rotation transmission that transmits a rotational force of the wheel to the detected portion.

4. The sensor assembly according to claim 3, further comprising an engaging member provided on the rotation transmission and an engaged member provided on the detected portion, wherein the rotational force of the wheel is transmitted by bringing a circumferential end surface of the engaging member into abutment with a circumferential end surface of the engaged member.

5. The sensor assembly according to claim 3, wherein a radial direction intersects a wheel axis of the wheel at a right angle, and an outer circumferential edge portion of the detector and an outer circumferential edge portion of the detected portion are situated closer to the wheel axis in the radial direction than an outer circumferential edge portion of the hub.

6. The sensor assembly according to claim 1, wherein the detected portion faces the detector with a gap therebetween in the direction of a wheel axis of the wheel; and
   at least a portion of an outer circumferential edge of the gap is covered by a cover that is attached to the body frame.

7. The sensor assembly according to claim 1, wherein the detected portion faces the detector with a gap therebetween in the direction of a wheel axis of the wheel; and
   a circumferential projection is provided on one of the detected portion and the detector so as to project towards the other of the detected portion and the detector so as to define the gap.

8. The sensor assembly according to claim 7, wherein the circumferential projection is provided on an inner circumferential portion of one of the detected portion and the detector in a radial direction that intersects the wheel axis of the wheel at a right angle.

9. A drive unit comprising;
   an electric motor;
   a battery that supplies electric power to the electric motor;
   a power transmission that transmits motor torque from the electric motor to the wheel;

the sensor assembly according to claim 1; and a controller configured or programmed to control energy supplied to the electric motor based on an output of the detector.

10. A bicycle comprising:

the sensor assembly according to claim 1; and a display that displays results of an output from the detector.

* * * * *